Jan. 1, 1952     R. R. BORNGRAEBER     2,580,650
COVER STOP ROD
Filed Oct. 31, 1949

*INVENTOR.*
ROYCE R. BORNGRAEBER
*ATTORNEYS*

Patented Jan. 1, 1952

2,580,650

UNITED STATES PATENT OFFICE 2,580,650

COVER STOP ROD

Royce R. Borngraeber, Horicon, Wis., assignor to John Deere Van Brunt Company, Horicon, Wis., a corporation of Wisconsin Application October 31, 1949, Serial No. 124,700

5 Claims. (Cl. 217—60)

The present invention relates generally to agricultural implements and more particularly to the hopper constructions of such implements as fertilizer distributors, grain drills and the like.

The object and general nature of the present invention is the provision of a new and useful cover stop construction for the covers of the hoppers of such implements as fertilizer distributors, grain drills and the like. In such implements, the hopper covers have to be opened at relatively frequent intervals for the purpose of refilling the hoppers, and other purposes, and one of the principal features of the present invention is the provision of means for holding the cover in its open position, preventing the same from opening too far and thereby making it difficult for the operator to reach the cover for reclosing it, such means being constructed and arranged, however, so that no part of the cover-control means drops down into contact or interference with the fertilizer or other material in the hopper when the cover is closed.

These and other objects and advantages of the present invention will be apparent to those skilled in the art after a consideration of the following detailed description of a preferred embodiment of the present invention, which is shown in the accompanying drawings, in which.

Figure 2:
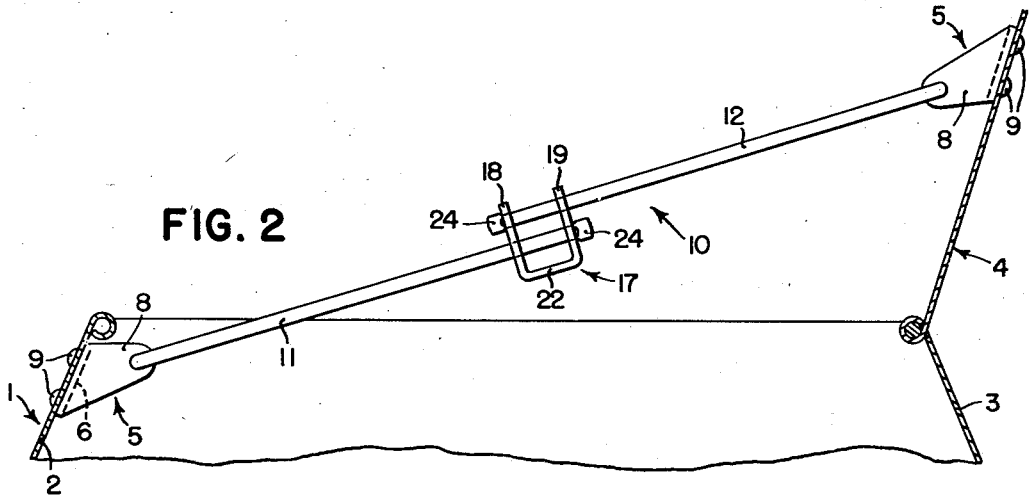
Figure 2 is a view similar to Figure 1, showing the cover in an open position and the means embodying the principles of the present invention provided for holding the cover in its open position.
Figure 3:
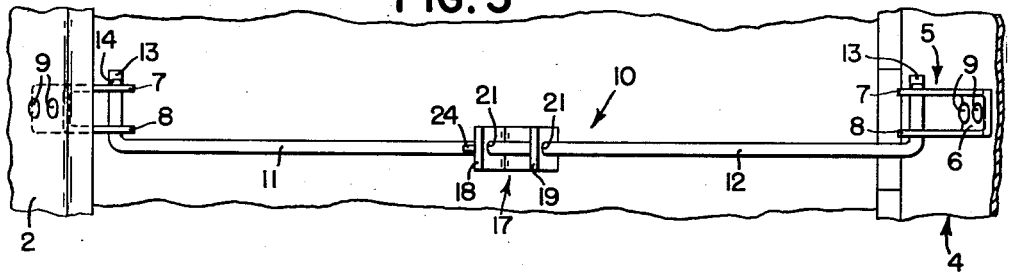
Figure 3 is a fragmentary plan view of the construction shown in Figure 2.

Referring now to the drawings, the reference numeral 1 indicates the hopper of a fertilizer distributor having transversely disposed side walls 2 and 3 and a cover 4 hinged to the side wall 3. Secured to the side wall 2 is a bracket 5 which, as best shown in Figure 3, comprises a U-shaped member having a central attaching section 6 and apertured lug portions 7 and 8. A second bracket 5 of identical construction is fixed, as by bolts or rivets 9, to the cover 4. As best shown in Figure 2, rivets 9 also secure the bracket 5 to the hopper wall 2. The cover stop construction, with which the principles of the present invention are more particularly concerned, is indicated in its entirety by the reference numeral 10 and includes a pair of identical rods 11 and 12, each having a laterally turned end portion 13 disposed in the apertures in the lugs 7 and 8 of the associated bracket 5. A cotter 14 serves to hold the outer end of each of the rods 11 and 12 in assembled relation with the associated bracket 5.

Figure 1:
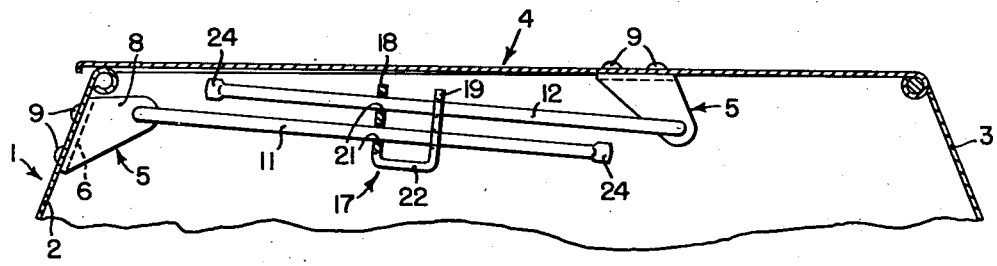
Figure 1 is a cross section of the upper portion of a fertilizer distributor hopper, showing the cover in a closed position.

As best shown in Figure 2, the inner end portions of the rods 11 and 12 are arranged in overlapping relation and the inner portions of the rods receive a U-shaped interconnecting member 17, the leg portions 18 and 19 of which are apertured, as at 21, to receive the rods 11 and 12. A central portion 22 of the member 17 serves to maintain the sides or leg portions 18 and 19 in spaced-apart relation, and the apertures 21 are dimensioned so that the rods, while being snugly received therein, are slidable relative thereto. After the member 17 has been assembled on the overlapping portions of the rods 11 and 12 the inner end of each of the rods is flattened, as at 24, to form a stop section which, as best shown in Figure 1, is extended beyond the diameter of the rod, whereby the member 17 is held in position. As best shown in Figure 2, the parts are so proportioned that the stop sections 24 come up against the side sections 18 and 19 of the interconnecting member 17 so as to limit the extending movement of the rods 11 and 12 and thus hold the cover 4 in its wide-open position.

The distance, longitudinally of the rods 11 and 12, between the side sections 18 and 19 of the rod-interconnecting member 17 is sufficient to provide rigidity against downward deflection of the inner portions of the rods 11 and 12, whereby the inner end of each rod is supported on the other, the rods being thereby self-supporting by virtue of the member 17. In this way, the inner ends of the rods 11 and 12 are prevented from dropping downwardly into the material carried in the hopper 1, both in the closed position as well as the open position of the cover 4. It is not necessary that the member 17 be slidable along both of the rods since, for example, the member 17 might be fixed to the end of one of the rods while the other rod is slidable relative thereto. In that case one of the flattened portions 24 may be omitted, if desired.

While I have shown and described above the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

1. A cover stop rod construction for fertilizer distributors and the like of the type having a hopper and a cover hinged to one wall of the hopper, said stop rod construction comprising a pair of rods extending alongside one another with their inner end portions disposed in overlapping relation, means pivotally connecting the outer ends of said rods to the cover and the opposite wall of the hopper, and means separate from both of said rods and having spaced apart rod-receiving apertured portions slidably interconnecting the overlapping portions of the rods to accommodate opening and closing of the cover, said rod-receiving apertured portions engaging said rod portions at points longitudinally spaced apart so that the overlapping portions of the rods are mutually self-supporting, whereby the rods do not drop down into material in the hopper, when the cover is closed.

2. A cover stop rod construction for fertilizer distributors and the like of the type having a hopper and a cover hinged to one wall of the hopper, said stop rod construction comprising a pair of rods extending alongside one another with their inner end portions disposed in overlapping relation, means pivotally connecting the outer ends of said rods to the cover and the opposite wall of the hopper, and a member separate from both of said rods and having spaced means connecting adjacent portions of said rods and engaging both rods at longitudinally spaced points on each, whereby the inner end portions of said rods are mutually self-supporting, said member being slidable relative to both rods to accommodate opening and closing of the cover.

3. A cover stop rod construction for fertilizer distributors and the like of the type having a hopper and a cover hinged to one wall of the hopper, said stop rod construction comprising a pair of rods extending alongside one another with their inner end portions disposed in overlapping relation, means pivotally connecting the outer ends of said rods to the cover and the opposite wall of the hopper, a U-shaped member slidably carried by one rod adjacent its inner end and having spaced-apart sections apertured to slidably receive the inner end of the other rod, said sections being spaced apart longitudinally of said other rod so as to cause the inner end portions of said rods to be self-supporting, whereby the rods do not drop down into material in the hopper, when the cover is closed, and a stop on the inner end of said other rod and engageable with said U-shaped member for limiting the relative outward movement of said rods, thereby serving to hold said cover in its wide-open position.

4. A cover stop rod construction for fertilizer distributors and the like of the type having a hopper and a cover hinged to one wall of the hopper, said stop rod construction comprising a pair of substantially identical rods extending alongside one another with their inner end portions disposed in overlapping relation, means pivotally connecting the outer ends of said rods to the cover and the opposite wall of the hopper, a U-shaped member having sections apertured to slidably receive the overlapping portions of said rods, said sections being spaced apart along said rod portions whereby the latter are mutually self-supporting in either the open or closed position of the cover, and the inner end of each of said rods being flattened and extended diametrically of the rod to form stops to prevent said U-shaped member from becoming detached from either of said rods, said flattened portions respectively engaging said sections of said U-shaped member so as to hold the cover in its wide-open position.

5. In a cover construction for fertilizer distributors and the like of the type having a hopper and a cover hinged to one wall of the hopper, the improvement comprising a cover stop including a pair of elongated members extending alongside one another with their inner end portions disposed in overlapping relation, means pivotally connecting the outer ends of said members to the cover and the opposite wall of the hopper, a U-shaped member having sections apertured to slidably receive the overlapping portions of both of said elongated members, said sections being spaced apart along the overlapping portions of said elongated members whereby the latter are mutually self-supporting in either the open or closed position of the cover, and a stop on the inner end of each of said elongated members to prevent said U-shaped member from becoming detached from either of said elongated members and for holding said cover in its wide open position.

ROYCE R. BORNGRAEBER.

REFERENCES CITED

The following references are of record in the file of this patent:

UNITED STATES PATENTS

| Number | Name | Date |
|---|---|---|
| 1,817,666 | Bayer | Aug. 6, 1931 |